(12) United States Patent
Bagnall

(10) Patent No.: US 9,091,174 B2
(45) Date of Patent: Jul. 28, 2015

(54) METHOD OF REDUCING ASYMMETRIC FLUID FLOW EFFECTS IN A PASSAGE

(75) Inventor: Adam M Bagnall, Belper (GB)

(73) Assignee: ROLLS-ROYCE plc, London (GB)

( * ) Notice: Subject to any disclaimer, the term of this patent is extended or adjusted under 35 U.S.C. 154(b) by 760 days.

(21) Appl. No.: 13/466,523

(22) Filed: May 8, 2012

(65) Prior Publication Data

US 2012/0288365 A1 Nov. 15, 2012

(30) Foreign Application Priority Data

May 13, 2011 (GB) .................................. 1108001.7

(51) Int. Cl.
F01D 9/04 (2006.01)
F01D 5/14 (2006.01)
F01D 9/06 (2006.01)

(52) U.S. Cl.
CPC ................ *F01D 5/141* (2013.01); *F01D 9/041* (2013.01); *F01D 9/065* (2013.01); *Y02T 50/671* (2013.01); *Y02T 50/673* (2013.01); *Y10T 29/49238* (2015.01)

(58) Field of Classification Search
USPC ............ 415/208.1, 208.2, 191, 194; 416/203; 29/889.22, 889.7
See application file for complete search history.

(56) References Cited

U.S. PATENT DOCUMENTS

| 4,765,046 A * | 8/1988 | Partington et al. ......... 29/889.21 |
| 7,094,027 B2 * | 8/2006 | Turner et al. ................. 415/194 |
| 7,234,914 B2 * | 6/2007 | Usab et al. ......................... 415/1 |
| 2007/0048129 A1 | 3/2007 | Chang et al. |
| 2008/0286108 A1 * | 11/2008 | Lui et al. .................... 416/229 R |
| 2010/0284801 A1 * | 11/2010 | Greim et al. ............... 415/182.1 |
| 2010/0322774 A1 * | 12/2010 | Morrison .................. 416/223 A |

FOREIGN PATENT DOCUMENTS

| EP | 1 424 467 A2 | 6/2004 |
| FR | 2 681 644 A1 | 3/1993 |
| GB | 1 235 545 | 6/1971 |
| GB | 2 046 849 A | 11/1980 |
| GB | 2 401 654 A | 11/2004 |
| GB | 2475140 A | 5/2011 |
| JP | A-6-74001 | 3/1994 |
| JP | A-6-173606 | 6/1994 |

OTHER PUBLICATIONS

Aug. 30, 2011 Search Report issued in British Patent Application No. GB1108001.7.

* cited by examiner

*Primary Examiner* — Dwayne J White
*Assistant Examiner* — Justin Seabe
(74) *Attorney, Agent, or Firm* — Oliff PLC

(57) ABSTRACT

A method of reducing the fluid flow effects of one or more flow modifiers (19) in a passage (16), the method comprising: providing a plurality of aerofoil structures (15) in the passage (16), wherein the geometry of each aerofoil structure (15) is initially substantially the same; and shortening the trailing edge (18) of one or more selected aerofoil structures (17) in a chordwise direction and over at least a spanwise portion of the one or more selected aerofoil structures such that, when in use, the direction of the fluid flow (20a, 20e) in the vicinity of the one or more selected aerofoil structures is altered and the fluid flow effects of the one or more flow modifiers (19) in the passage are reduced.

10 Claims, 3 Drawing Sheets

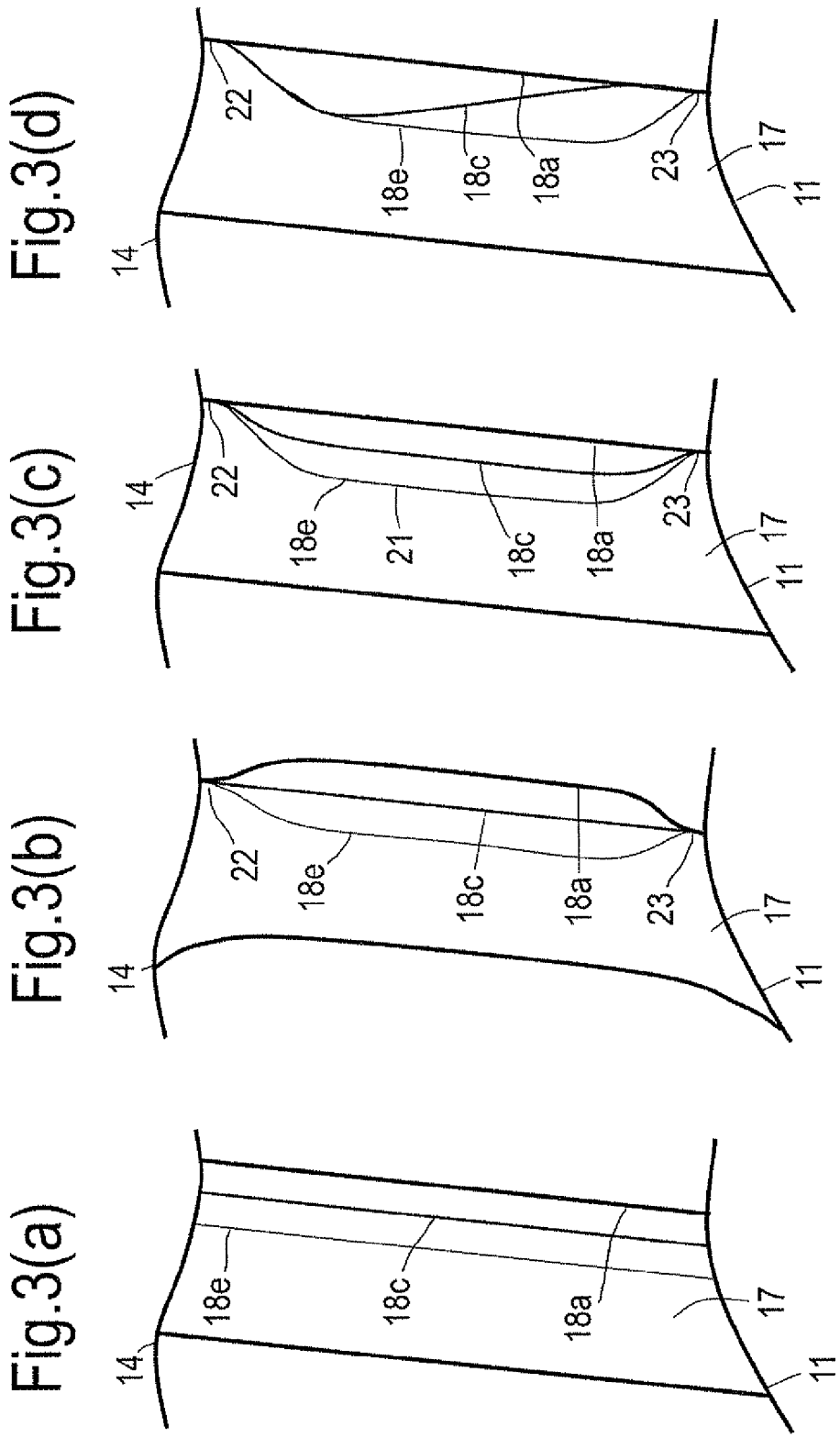

METHOD OF REDUCING ASYMMETRIC FLUID FLOW EFFECTS IN A PASSAGE

Figure 1:
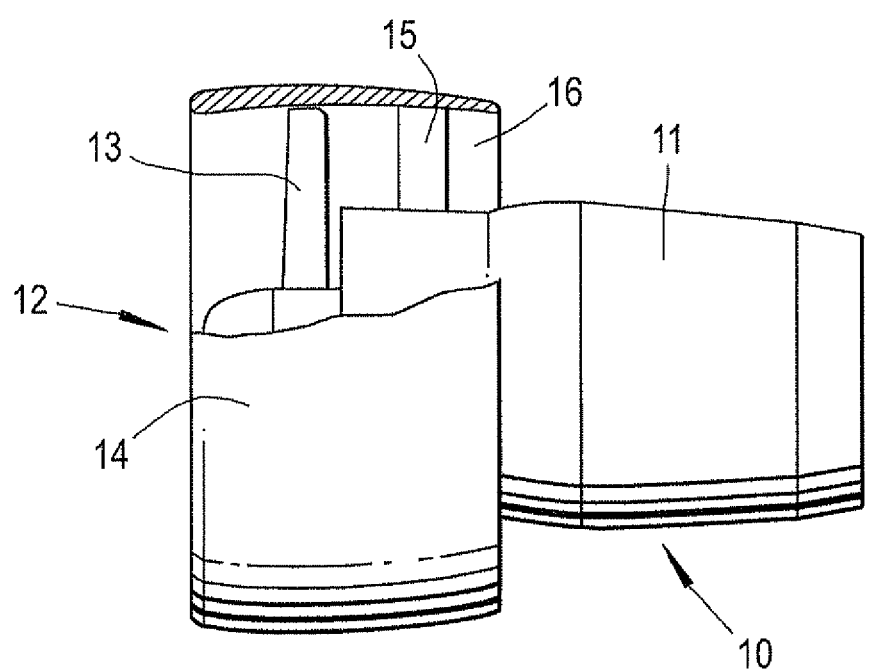

This invention relates to a method of reducing asymmetric fluid flow effects in a passage and particularly but not exclusively relates to an aerofoil structure for mitigating the effects of asymmetric flow in the bypass duct of a jet engine.

Typically, in an aero-engine fan system, there are asymmetries in the flow passage due to the intake upstream of the fan and blockages and outlet guide vanes within the bypass duct downstream of the fan. These asymmetries can generate non-uniform aerodynamic loading around the circumference of both the fan and the outlet guide vanes. This variation can deteriorate the aerodynamic performance and generate excessive mechanical loadings on the fan and/or outlet guide vanes.

To mitigate these effects previous aero-engines have incorporated cyclic variations in the vane setting angle and variations in vane camber to match the aerodynamic performance to the asymmetric environment and to limit the mechanical excitation of the fan and outlet guide vanes. The camber variation has been achieved by having two or more standards of vane each with similar chord lengths. However, this solution has a practical limit to the variations in camber in order to control parts inventory. Furthermore, this limit on camber variation compromises the quality of the solution in terms of aerodynamic performance and mechanical forcing because the step changes in camber around the circumference impose a discontinuous variation in either inlet vane angle or exit vane angle or both.

In addition, it is undesirable to use such vanes with discrete variations in camber if the vanes are tangentially leant to an extent that may, for example, be required for noise attenuation. This is because the vane setting angle and camber variations are required to encourage the flow to pass either side of downstream obstructions (for example, the supports securing the engine core to the outer casing) and these obstructions tend to be at the same angular disposition irrespective of radial distance from the engine centreline. Thus, for a tangentially leant aerofoil, which is nominally disposed in front of an obstruction, then its hub end will be upstream of one side of the obstruction, whilst its tip end will be upstream of the opposite side of the obstruction. This means that a simple vane setting angle change or camber angle change of the whole aerofoil will not be able to deflect, simultaneously, the airflow around both sides of the disturbance, as needed to ease the airflow at opposite ends of the vane for good performance. (By contrast, a vane without tangential lean will be disposed in a similar relative angular position upstream of the obstruction along its whole spanwise length, such that a simple vane setting angle or camber angle change will encourage the airflow to pass around the appropriate side of the obstruction.)

Other solutions to the aforementioned problem have been proposed, for example GB1235545 discloses a vane comprising a rigid spine and a thin flexible sheet shaped to form at least a part of the aerodynamic surface and actuation means for distorting the flexible sheet to vary the camber of the blade. However, such a solution is complex and it is difficult to precisely control the shape of the flexible sheet in order to minimise losses.

The present invention therefore seeks to address these issues.

According to a first aspect of the present invention there is provided a method of reducing the fluid flow effects of one or more flow modifiers, for example obstructions or asymmetries, in a passage, the method comprising: providing a plurality of aerofoil structures in the passage, wherein the geometry of each aerofoil structure is substantially the same; and shortening or cropping a trailing edge of one or more selected aerofoil structures in a chordwise direction and over at least a spanwise portion of the one or more selected aerofoil structures such that, when in use, the direction of the fluid flow in the vicinity of the one or more selected aerofoil structures is altered and the fluid flow effects of the one or more flow modifiers in the passage are reduced.

The shortening of the one or more selected aerofoil structures may be performed after installation of the aerofoil structures in the passage, i.e. in situ. Alternatively, the shortening of the one or more selected aerofoil structures may be performed prior to installation of the aerofoil structures in the passage. The shortening of the one or more selected aerofoil structures may be performed on individual aerofoil structures prior to assembling in a ring or once the aerofoil structures have been assembled into a ring.

The method may comprise varying the extent of the shortening along the span of the one or more aerofoil structures so as to form a taper along the span of the one or more aerofoil structures. The shortening of the one or more selected aerofoil structures may comprise one or more of grinding, filing and milling. Alternatively, the shortening of the one or more selected aerofoil structures may be achieved by placing inserts into a mould prior to casting the aerofoil structure. The geometry of each aerofoil structure may be substantially the same notwithstanding the shortening of the one or more selected aerofoil structures.

The method may comprise reducing a camber angle of the one or more selected aerofoil structures. The method may comprise diverting the fluid flow away from one or more obstacles downstream of the aerofoil structures.

The method may further comprise arranging the aerofoil structures such that a setting angle of each aerofoil structure is approximately equal. Alternatively, the method may further comprise arranging the aerofoil structures such that a setting angle of one or more aerofoil structure is varied so as to account for asymmetric flow effects upstream of the aerofoil structures.

According to a second aspect of the present invention there is provided an assembly for reducing the fluid flow effects of one or more flow modifiers in a passage, the assembly comprising: a plurality of aerofoil structures provided in the passage, the geometry of each aerofoil structure being substantially the same except for one or more selected aerofoil structures comprising a shortened trailing edge in a chordwise direction and over at least a spanwise portion of the one or more selected aerofoil structures such that, when in use, the direction of the fluid flow in the vicinity of the one or more selected aerofoil structures is altered and the fluid flow effects of the one or more flow modifiers in the passage are reduced.

The flow modifiers may be located one or more of upstream and downstream of the aerofoil structures. The flow modifiers may comprise an asymmetry in the passage, further guide vanes, structural supports or any other blockage.

The aerofoil structures may be arranged such that a setting angle of each aerofoil structure is approximately equal. The aerofoil structures may be arranged such that a setting angle of one or more aerofoil structures is varied so as to account for asymmetric flow effects upstream of the aerofoil structures.

A turbomachine may comprise the assembly described above. A gas turbine may comprise the assembly described above.

For a better understanding of the present invention, and to show more clearly how it may be carried into effect, reference will now be made, by way of example, to the accompanying drawings, in which:—

Figure 2:
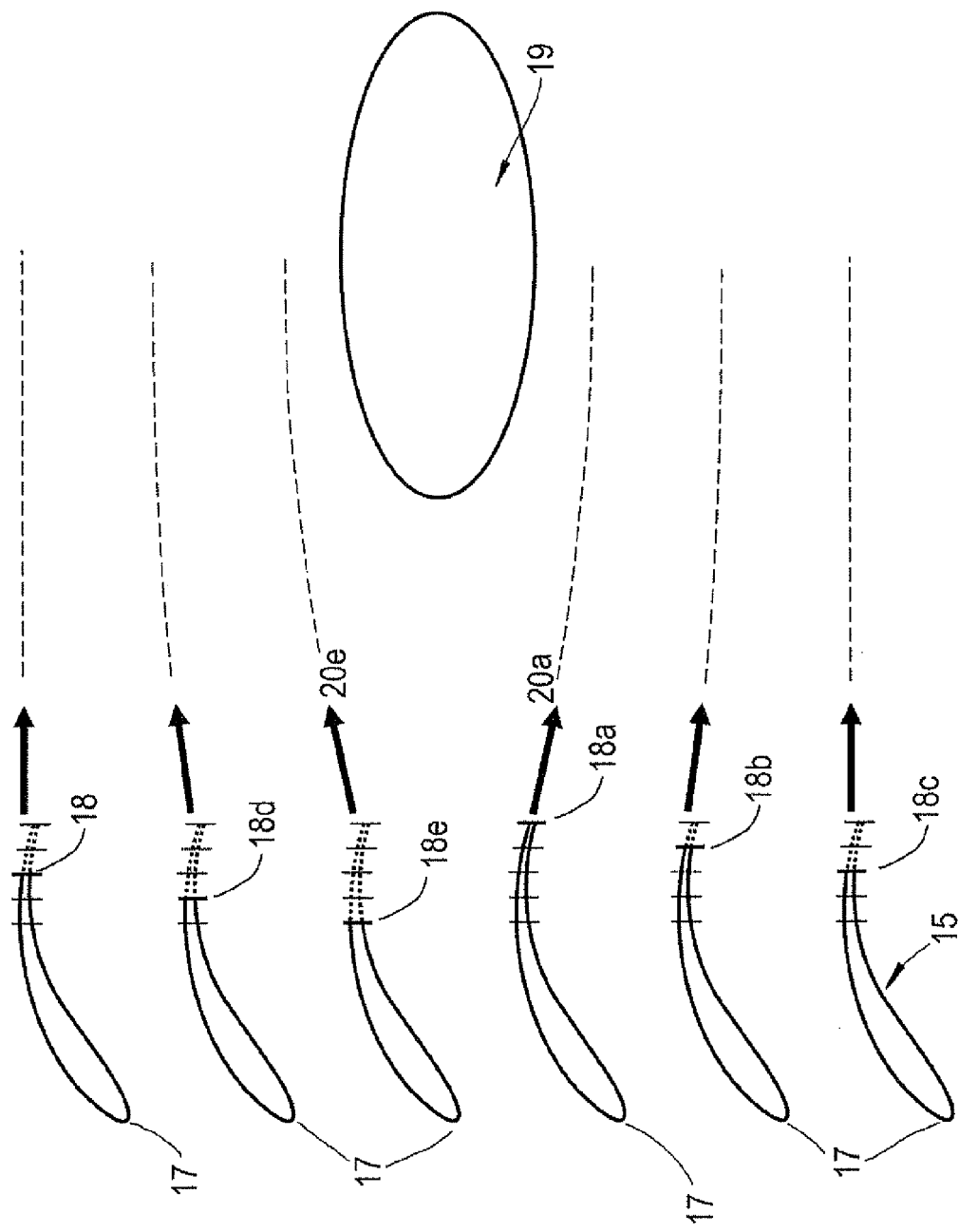

FIG. 1 shows a partially cut away side view of a gas turbine jet engine;

FIG. 2 is an illustration of cyclic blading to divert flow around a downstream blockage and shows a radial side view of a plurality of aerofoil structures according to an embodiment of the present invention; and FIG. 3 shows circumferential side views of aerofoil structure according to embodiments of the present invention with FIG. 3(a) showing uniform cropping along the complete span; FIG. 3(b) showing uniform cropping along the span without cropping at the end fixings (for a nominal vane having a straight trailing edge); FIG. 3(c) showing uniform cropping along the span without cropping at the end fixings (for a maximum camber vane having a straight trailing edge); and FIG. 3(d) showing tapered cropping along the span again without cropping at the end fixings.

With reference to FIG. 1, a gas turbine engine 10, according to an embodiment of the present invention, comprises a main gas generator section (or core) 11 and a fan 12. The fan comprises a plurality of rotor blades 13 which rotate within a cowling 14, the cowling 14 being attached to fixed structure of an aircraft (not shown). The gas generator section 11 is carried from the cowling 14 by way of a plurality of aerofoil structures (for example, stator blades and guide vanes) 15 which extend between the cowling and the gas generator in a radially extending array and which may perform the dual purpose of providing mechanical support for the generator section and acting as outlet guide vanes for the fan 12. A passage 16 between the gas generator section 11 and the cowling 14 constitutes a bypass duct through which a portion of the flow entering the fan 12 bypasses the gas generator section 11. The plurality of aerofoil structures 15 are provided in the passage 16.

With reference to FIG. 2, the plurality of aerofoil structures 15 according to the present invention comprise substantially the same geometry except for one or more selected aerofoil structures 17 which comprise a cropped or shortened trailing edge. (The remaining aerofoil structures may also be cropped, but by a nominal amount constant for all the remaining aerofoil structures.) The trailing edges are cropped in a chordwise direction and this cropping is present over at least a spanwise portion of the one or more selected aerofoil structures 17. As shown in FIG. 2, the trailing edges may be cropped by varying amounts. The extent of the cropping is denoted by reference numerals 18a, 18b, 18c, 18d and 18e with 18a representing a trailing edge without any cropping and 18e a trailing edge with the maximum amount of cropping. (The trailing edge with the nominal amount of cropping used for the remaining aerofoil structures is denoted by 18 and this may correspond to an intermediate amount of cropping denoted by 18c.)

The cropped trailing edges 18a, 18b, 18c, 18d, 18e are arranged such that, when in use, the direction of the fluid flow in the vicinity of the one or more selected aerofoil structures 17 is altered and the fluid flow effects of the one or more obstructions 19 in the passage are reduced. In other words, by shortening the trailing edge of an aerofoil structure, the flow adjacent to that aerofoil structure will not undergo as much turning (see for example arrow 20e indicating the flow direction exiting from the cropped trailing edge 18e in FIG. 2). This portion of the flow can therefore be redirected to go around one side of an obstacle 19 downstream of the aerofoil structures 15. Conversely, by not shortening the trailing edge of an aerofoil structure, the flow adjacent to that aerofoil structure will undergo more turning (see for example arrow 20a indicating the flow direction exiting from the un-cropped trailing edge 18a in FIG. 2). This portion of the flow can therefore be diverted to go around the other side of the obstacle 19 downstream of the aerofoil structures 15.

The aerofoil structures 17 neighbouring the aerofoil structures with the trailing edge 18a, 18e may also comprise cropped trailing edges 18b, 18d respectively. The extent of cropping for these neighbouring aerofoil structures may be intermediate that for the trailing edges 18a, 18e and the remaining trailing edges 18c. In this way, the changes in flow direction around the obstacle 19 may be smoothed out over a number of adjacent aerofoil structures.

By shortening the trailing edges 18 of the selected aerofoil structures 17, the plurality of aerofoil structures comprise a variation in their camber angles. The plurality of aerofoil structures 17 otherwise exhibit the same camber angles and aerofoil profile. (NB, the camber angle is the external angle formed by the intersection of the tangents to the camber line at the leading and trailing edges. The camber angle is equal to the sum of the angles formed by the chord line and the camber-line tangents. The camber line is the mean line of the blade profile and extends from the leading edge to the trailing edge, halfway between the pressure surface and the suction surface of the aerofoil surface.) The variation in the camber is achieved by a variation of the trailing edge shortening of an initially over-cambered aerofoil. An over-cambered aerofoil will have more camber (i.e. chord-wise curvature from the leading edge to the trailing edge) than necessary to turn the fluid from a swirling flow direction to an axial flow direction.

By starting from over-cambered aerofoil structures and varying the extent of trailing edge cropping, the flow leaving the aerofoil structure may have a positive or negative circumferential velocity and a range of flow directions can be achieved. For example, by not cropping the trailing edge 18a or cropping the trailing edge 18b less than for a nominally cropped aerofoil structure (e.g. trailing edge 18c), the flow leaving the aerofoil structure will have a negative circumferential velocity. Conversely, by cropping the trailing edge 18d, 18e more than for a nominally cropped aerofoil structure (e.g. trailing edge 18c), the flow leaving the aerofoil structure will have a positive circumferential velocity.

With reference to FIG. 3, the selected aerofoils 17 are cropped at their trailing edges 18 over at least a portion of the span-wise height to an extent determined by the requirements of the flow asymmetry at that circumferential position and span-wise height.

FIG. 3(a) shows an example in which the selected aerofoil structures 17 are cropped along their whole span by varying amounts as illustrated by the trailing edges 18a, 18c and 18e. Each of the trailing edges 18a, 18c, 18e depicted are substantially straight.

FIG. 3(b) shows a further example, which in contrast to the example shown in FIG. 3(a), the trailing edge 18a, 18c, 18e is not cropped at the spanwise ends 22, 23 of the aerofoil structure trailing edge. Accordingly, the trailing edge 18a of the un-cropped aerofoil structure may be curved and may have extra chord at the trailing edge such that a cropped trailing edge 18c has a substantially straight trailing edge. In the case illustrated, the nominal camber vane 18c with an intermediate level of trailing edge cropping has a straight trailing edge, but it should be understood that the extra chord of the un-cropped aerofoil structure (i.e. with trailing edge 18a) can be chosen to provide a straight trailing edge with other levels of trailing edge cropping.

In another example shown in FIG. 3(c), the selected aerofoil structure 17 comprises a chord length which tapers from the innermost wall end 23 (which corresponds to the gas generator section 11 shown in FIG. 1) to a minimum chord length at a point 21 between the innermost wall and the outermost wall end 22 (which in turn corresponds to the cowling 14). The chord tapers out again from the minimum point 21 to the outermost wall. The taper may comprise a smooth curve from the gas generator 11 to the cowling 14. The extent of the cropping of the trailing edges, as illustrated by the range of trailing edges 18a, 18c and 18e, can be varied from one aerofoil structure to the next to provide a gradual variation in the camber of the aerofoil structures. In the example shown in FIG. 3(c) the un-cropped aerofoil structure (i.e. that with the maximum camber) has a substantially straight trailing edge. For this and any other example, the chord may be cropped by up to 20% of the chord length, but may be cropped by as much as 40%.

FIG. 3(d) shows a further example in which the extent of the cropping may vary in a spanwise direction between the ends 22, 23. For example, the cropped trailing edge 18c may be tapered along its spanwise length. The amount of flow turning may therefore vary along the length of the aerofoil structure 17. This may be useful if the obstacle 19 is at a particular radial position and the flow only needs to be adjusted in that radial region.

The cropping of the chord can be applied either prior to fitting the aerofoil structures 17 or as a machining operation after the aerofoil structures 17 have been fitted into a complete assembly. The cropping of the one or more selected aerofoil structures may be performed after installation of the aerofoil structures in the passage, i.e. in situ. Alternatively, the cropping of the one or more selected aerofoil structures may be performed prior to installation of the aerofoil structures in the passage. The cropping of the one or more selected aerofoil structures may be performed on individual aerofoil structures prior to assembling in a ring or once the aerofoil structures have been assembled into a ring. The cyclic camber variation can be tailored to different individual requirements by cropping a complete set of over-cambered vanes at a later stage in the manufacture (e.g. for handed engine installations).

The cropping of the one or more selected aerofoil structures may comprise one or more of grinding, filing and milling and may be performed by hand or machine, for example a milling machine. Alternatively, the cropping of the one or more selected aerofoil structures may be achieved by placing inserts into a mould prior to casting the aerofoil structure.

The cropping of the over-cambered aerofoil structures can be incorporated with a cyclic variation in the setting angle of the aerofoil structures so that a more ideal pattern of inlet angle and camber can be specified at each circumferential and span-wise location. This may be beneficial if there is asymmetry upstream of the fan 12. On the other hand, if there is no asymmetry upstream of the fan 12, it may be desirable that the aerofoil structures are set at the same vane inlet angle and the camber can be tailored to exactly match and cancel out any downstream asymmetries. (NB, the setting angle of an aerofoil structure is the bulk angular rotation of the aerofoil about an imaginary pivot, nominally extending from hub to tip of the aerofoil and in effect sets the blade inlet and outlet angles. As such the setting angle is typically equivalent to the stagger angle, which is the angle between the chord line of the aerofoil structure and the axial direction. However, as some of the aerofoil structures of the present invention are cropped, their chord line and hence stagger angle will change. By contrast, the setting angle remains unchanged when the aerofoil structure is cropped.)

In the case of no inlet asymmetry and hence no variation in the setting angle of each aerofoil structure, then a completely uniform assembly can be manufactured and the aerofoil structures cropped as necessary at a later time during the manufacture and/or assembly of the engine. This could save considerable time during engine development. Only one design of aerofoil needs to be formed, with consequent inventory benefits.

The aerodynamic performance can be optimised to the asymmetry without compromising the mechanical forcing of the fan 12 and aerofoil structures (outlet guide vanes) 15. The aerodynamic loading of each aerofoil structure 15 is closer to the optimum due to the reduction in chord as the turning requirement is reduced: this will maximise performance and minimise weight. Furthermore, it has been found that the cropping of the aerofoil structures does not significantly impact the aerodynamic efficiency of the aerofoil nor its natural frequency. In terms of the aerodynamic efficiency, the reduction of the wetted surface will reduce the skin friction drag. With respect to the natural frequency, the loss of mass from the cropped portion offsets to some extent the shortening of the aerofoil structure, thereby approximately maintaining the natural frequency.

The present invention permits a cyclic variation in the aerofoil camber to be used with tangentially leant aerofoil structures. This can be achieved by differentially cropping each end of the tangentially leant aerofoil such that the aerofoil turns the flow by varying amounts across its span, e.g. as illustrated in FIG. 3(d). In this way, the tangentially leant aerofoil can direct flow in a first direction at one end of the aerofoil and in a second direction at another end. The flow may therefore be diverted either side of the downstream obstruction by the same aerofoil structure.

More generally, the present invention could be applied to compressor outlet guide vanes, in particular Intermediate Pressure (IP) and High Pressure (HP) compressors. The present invention may also be applied to water jet thrusters.

The invention claimed is:

1. A method of reducing the fluid flow effects of one or more obstacles in a passage of a gas turbine engine, the method comprising:
   providing a plurality of aerofoil structures in the passage upstream of the one or more obstacles, wherein the geometry of each aerofoil structure is substantially the same;
   shortening at least one trailing edge of one or more selected aerofoil structures in a chordwise direction and over at least a spanwise portion of the one or more selected aerofoil structures such that, when in use, the direction of the fluid flow in the vicinity of the one or more selected aerofoil structures is altered and the fluid flow effects of the one or obstacles in the passage are reduced; and
   arranging the aerofoil structures such that a setting angle of each aerofoil structure is approximately equal; and
   varying an amount that is shortened from each of the trailing edges such that at least one of the trailing edges is not shortened and is provided adjacent to at least one trailing edge that is shortened.

2. A method as claimed in claim 1, wherein the shortening of the one or more selected aerofoil structures is performed after installation of the aerofoil structures in the passage.

3. A method as claimed in claim 1, wherein the shortening of the one or more selected aerofoil structures is performed prior to installation of the aerofoil structures in the passage.

4. A method as claimed in claim 1, wherein the method comprises reducing a camber angle of the one or more selected aerofoil structures.

5. A method as claimed in claim 1, wherein the shortening of the one or more selected aerofoil structures comprises one or more of grinding, filing and milling.

6. A method as claimed in claim 1, wherein the method comprises varying the extent of the shortening along the span of the one or more aerofoil structures so as to form a taper along the span of the one or more aerofoil structures.

7. A method as claimed in claim 1, wherein the method further comprises arranging the aerofoil structures such that a setting angle of each aerofoil structure is approximately equal.

8. A gas turbine engine comprising an assembly for reducing the fluid flow effects of one or more obstacles in a passage, the assembly comprising:
   a plurality of aerofoil structures provided in the passage upstream of the obstacle, the geometry of each aerofoil structure being substantially the same except for one or more selected aerofoil structures comprising a plurality of trailing edges in a chordwise direction and over at least a spanwise portion of the one or more selected aerofoil structures such that, when in use, the direction of the fluid flow in the vicinity of the one or more selected aerofoil structures is altered and the fluid flow effects of the one or more flow modifiers in the passage are reduced, wherein:
   the aerofoil structures are arranged such that a setting angle of each aerofoil structure is approximately equal, and
   at least one of the trailing edges is not shortened and provided adjacent to at least one of the trailing edges that is shortened.

9. An assembly as claimed in claim 8, wherein the flow modifiers comprise an asymmetry in the passage.

10. An assembly as claimed in claim 8, wherein the aerofoil structures are arranged such that a setting angle of each aerofoil structure is approximately equal.

* * * * *